(12) United States Patent
Chebyshev et al.

(10) Patent No.: US 11,275,835 B2
(45) Date of Patent: Mar. 15, 2022

(54) METHOD OF SPEEDING UP A FULL ANTIVIRUS SCAN OF FILES ON A MOBILE DEVICE

(71) Applicant: AO Kaspersky Lab, Moscow (RU)

(72) Inventors: Victor V. Chebyshev, Moscow (RU); Dmitry N. Glavatskikh, Moscow (RU); Konstantin M. Filatov, Moscow (RU); Vladimir A. Kuskov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 175 days.

(21) Appl. No.: 16/574,554

(22) Filed: Sep. 18, 2019

(65) Prior Publication Data
US 2020/0327227 A1    Oct. 15, 2020

(30) Foreign Application Priority Data
Apr. 15, 2019  (RU) .................................. 2019111143

(51) Int. Cl.
*G06F 21/56* (2013.01)
*G06F 21/64* (2013.01)

(52) U.S. Cl.
CPC .......... *G06F 21/565* (2013.01); *G06F 21/563* (2013.01); *G06F 21/64* (2013.01)

(58) Field of Classification Search
CPC ...... G06F 21/565; G06F 21/563; G06F 21/64; G06F 21/562; G06F 21/564; G06F 21/645; G06F 16/152
See application file for complete search history.

(56) References Cited

U.S. PATENT DOCUMENTS

| 6,094,731 | A | * | 7/2000 | Waldin | G06F 21/564 |
| | | | | | 714/2 |
| 2003/0041259 | A1 | * | 2/2003 | Vignoles | G06F 21/57 |
| | | | | | 726/22 |
| 2005/0132206 | A1 | * | 6/2005 | Palliyil | G06F 21/645 |
| | | | | | 713/188 |
| 2005/0283837 | A1 | * | 12/2005 | Olivier | G06F 21/56 |
| | | | | | 726/24 |
| 2006/0294589 | A1 | * | 12/2006 | Achanta | G06F 21/562 |
| | | | | | 726/24 |

(Continued)

*Primary Examiner* — Saleh Najjar
*Assistant Examiner* — Khalid M Almaghayreh
(74) *Attorney, Agent, or Firm* — Arent Fox LLP; Michael Fainberg (57) ABSTRACT

Systems and methods for performing a repeat antivirus scan of a file are disclosed. A local database is saved on a mobile device, where each record is added to the database when the corresponding file is recognized as being non-malicious as a result of an antivirus scan. A short hash sum of the file is computed and the long hash sum of the file and information about the antivirus scan performed and corresponding to the first hash sum of the file are found in the aforementioned database. Using the long hash sum, a verdict on the file is requested from the cloud services. An antivirus scan of the file is performed, except when the verdict obtained is unchanged (as compared to the verdict contained in the information about the antivirus scan performed of the obtained record corresponding to the file), and no updating of the antivirus databases has occurred since the date of performing the antivirus scan.

16 Claims, 4 Drawing Sheets

(56) References Cited

U.S. PATENT DOCUMENTS

| | | | |
|---|---|---|---|
| 2007/0150948 A1* | 6/2007 | De Spiegeleer | G06F 21/563 726/22 |
| 2008/0141373 A1* | 6/2008 | Fossen | H04L 63/145 726/23 |
| 2011/0197280 A1* | 8/2011 | Young | H04L 63/1416 726/24 |
| 2012/0159631 A1* | 6/2012 | Niemela | G06F 21/565 726/24 |
| 2012/0297486 A1* | 11/2012 | Turbin | G06F 21/562 726/24 |
| 2016/0098560 A1* | 4/2016 | Friedrichs | G06F 16/13 726/23 |
| 2016/0099963 A1* | 4/2016 | Mahaffey | H04L 63/1408 726/25 |
| 2020/0285743 A1* | 9/2020 | Strogov | G06F 16/152 |
| 2021/0081532 A1* | 3/2021 | Mungre | G06F 21/554 |

* cited by examiner

METHOD OF SPEEDING UP A FULL ANTIVIRUS SCAN OF FILES ON A MOBILE DEVICE

CROSS REFERENCE TO RELATED APPLICATIONS

The present application claims priority to Russian Patent Application No. 2019111143, filed on Apr. 15, 2019, the entire content of which is incorporated herein by reference.

FIELD OF TECHNOLOGY

The present disclosure relates to antivirus technologies, and more specifically to methods of selective performance of a repeat antivirus scan of archive files on a mobile device.

BACKGROUND

At present, mobile devices—smartphones, tablets, and so forth—have become a mandatory accessory of almost every person. With the aid of such devices, people perform a multitude of everyday tasks: from communicating by email to paying for purchases in shops. The widespread use of such devices is motivating criminals to create malicious programs—programs designed for unlawful access to user data, and also to the resources of mobile devices as a whole.

At present, antivirus software and services are widely used to combat malicious programs. These antivirus software and services are programs designed to protect computing devices against malicious programs. Different approaches and technologies are used to provide such protection: signature analysis, behavioral analysis, heuristic rules, and so forth. The performance of a full antivirus scan of a mobile device is a resource-hungry operation. Regular full antivirus scans result in rapid discharging of the battery of the mobile device, which in turn has a negative impact on the perception of antivirus products by users. On Android devices, because of the specifics of the OS, the majority of the files being scanned are archives in ZIP format. Unpacking the archives and checking the objects embedded in the archives takes up the vast majority of the total scan time. Thus, there is a need to develop antivirus technologies to optimize the consumption of resources when performing repeated antivirus scans on a mobile device. The use of the proposed technology makes it possible to both shorten the time for repeat scans of archive files and reduce the overall consumption of electricity on Android devices.

SUMMARY

The present disclosure is designed for the selective performance of a repeat antivirus scan of files. The technical result of the present disclosure is to reduce the consumption of resources of a mobile device when performing repeat antivirus scans of files. Yet another technical result of the present disclosure is to shorten the time for repeat antivirus scans of files.

In one aspect, a method of performing a repeat antivirus scan of a file is realized, and realized with the aid of a computing device, wherein: (a) the local database for files is saved, where each record is added to the database when the corresponding file is recognized as being not malicious as a result of the antivirus scan, and contains the first hash sum of the file, the second hash sum of the file, and information about the antivirus scan performed, which includes at least the date of the performance of the antivirus scan of the file and the verdict from cloud services; (b) the first hash sum of the file is computed and the second hash sum of the file and information about the antivirus scan performed, corresponding to the first hash sum of the file is found in said database; (c) using the second hash sum of the file, a verdict on the file is requested from cloud services; and (d) an antivirus scan of the file is always performed, except when the verdict obtained is unchanged, and no updating of the antivirus databases has occurred since the date of the performance of the antivirus scan.

In another aspect, the computing device is a mobile device.

In yet another aspect, the file is an archive file.

In another aspect, the antivirus scan of the file includes one or more of signature analysis of the file and heuristic analysis of the file.

In another aspect, the antivirus scan of the file includes one or a combination of requesting a verdict on the file from cloud services and an antivirus scan.

In another aspect, the verdict on the file from cloud services is one of the following: a malicious file; a non-malicious file; an unknown file.

In yet another aspect, the cloud services include: regularly updated knowledge databases on the reputation of files, databases of malicious files, and databases of trusted files.

In another aspect, the first hash sum is computed from part of the content of the file.

In another aspect, the second hash sum is computed from the entire content of the file.

In yet another aspect, the time to calculate the first hash sum of the file is less than the time to calculate the second hash sum of the file.

In one aspect, a computer-implemented method for performing a repeat antivirus scan of a file is provided. The method includes adding, to a local database on a computing device, a record for a corresponding file in response to determining that the corresponding file is not malicious based on a previous antivirus scan. The record includes a first hash sum of the file, a second hash sum of the file, and information about the antivirus scan performed including at least a date of performance of the previous antivirus scan of the file and a verdict from cloud services. The method further includes performing a repeat antivirus scan of the file by calculating the first hash sum of the file; retrieving, using the calculated first hash sum of the file, the second hash sum of the file and information about the previous antivirus scan performed, from the local database of the computing device; requesting from the cloud services, a verdict on the file using the second hash sum of the file; and refraining from performing the repeat antivirus scan of the file in response to determining that the verdict obtained is unchanged and that no updates to antivirus databases has occurred since the date of the performance of the previous antivirus scan; otherwise, performing the repeat antivirus scan of the file.

In another aspect, a system for performing a repeat antivirus scan of a file is provided. The system includes a memory device configured to store a local database, wherein the local database comprises a record for a corresponding file added in response to determining that the corresponding file is not malicious based on a previous antivirus scan, wherein the record comprises a first hash sum of the file, a second hash sum of the file, and information about the antivirus scan performed including at least a date of performance of the previous antivirus scan of the file and a verdict from cloud services. The system further includes a hardware processor communicatively coupled to the memory device. The processor is configured to performing a repeat antivirus scan of the file by calculate the first hash sum of the file; retrieve, using the calculated first hash sum of the file, the second hash sum of the file and information about the previous antivirus scan performed, from the local database of the computing device; request from the cloud services, a verdict on the file using the second hash sum of the file; and refrain from performing the repeat antivirus scan of the file in response to determining that the verdict obtained is unchanged and that no updates to antivirus databases has occurred since the date of the performance of the previous antivirus scan; otherwise, perform the repeat antivirus scan of the file.

According to another aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for performing a repeat antivirus scan of a file. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

A number of definitions and concepts which will be used in the description of variant embodiments of the present disclosure are described as follows.

Hashing is a transformation of an array of input data of arbitrary length into an (output) bit string of definite length, performed by a particular algorithm.

A hash function (or convolution function) is a function incorporating a hashing algorithm and performing the transformation.

A hash code (or hash sum, convolution) is the result of a hashing. A hash code is generally written in hexadecimal form. Thus, for a certain given file the value of the MD5 hash function will be a string of 32 hexadecimal digits, such as 026f8e459c8f89ef75fa7a78265a0025. For the CRC32 hash function, the hash code will be F6DE2FEA, and for SHA-1 the hash code will be 7DD987F846400079F4B03C058365A4869047B4A0.

Figure 4:
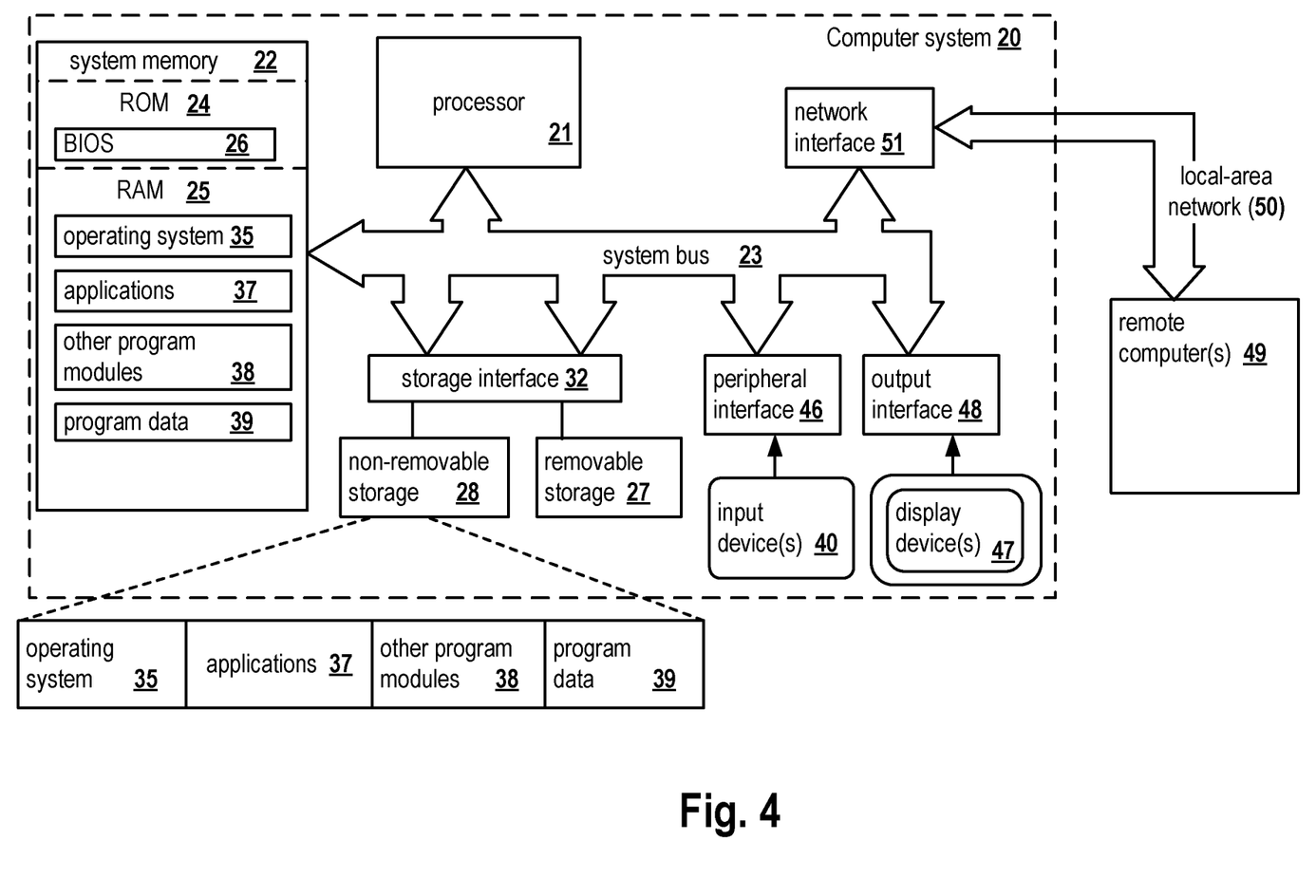
FIG. 4 represents an example of a computer system on which the present disclosure may be realized.

A malicious application is an application capable of doing harm to a computer or to the data of the computer's user (in other words, a computer system, such as the one depicted in FIG. 4), for example: an Internet worm, a keylogger, a computer virus. The harm done might be unlawful or unauthorized access to the resources of the computer, including the data saved on the computer, for the purpose of stealing it, and also unlawful use of the resources, including those for storing data, performing computations, and so forth.

A trusted application (a non-malicious application) is an application which does not do harm to a computer or to its user. A trusted application may be considered to be an application developed by a trusted software manufacturer, downloaded from a trusted source (such as a site entered in a database of trusted sites), or an application whose identifier (or other data by which the application may be uniquely identified, such as the hash sum of the application file) is kept in a database of trusted applications. The identifier of the manufacturer, such as a digital certificate, may also be kept in the database of trusted applications.

A non-trusted application (unknown application) is an application which is not trusted, but neither is it recognized as being malicious, for example, with the aid of an antivirus application. Furthermore, a non-trusted application may afterwards be recognized as being malicious, for example, with the aid of an antivirus scan.

A malicious file is a file which is a component of a malicious application and contains program code (executable or interpretable code).

A non-trusted file (unknown file) is a file which is a component of a non-trusted application and contains program code (executable or interpretable code).

A trusted file (non-malicious file) is a file which is a component of a trusted application.

An archive file is a specially organized file, containing one or more files in compressed or non-compressed form and service information as to the names of the files, the date and time of their creation or modification, their size, and so forth.

Figure 1:
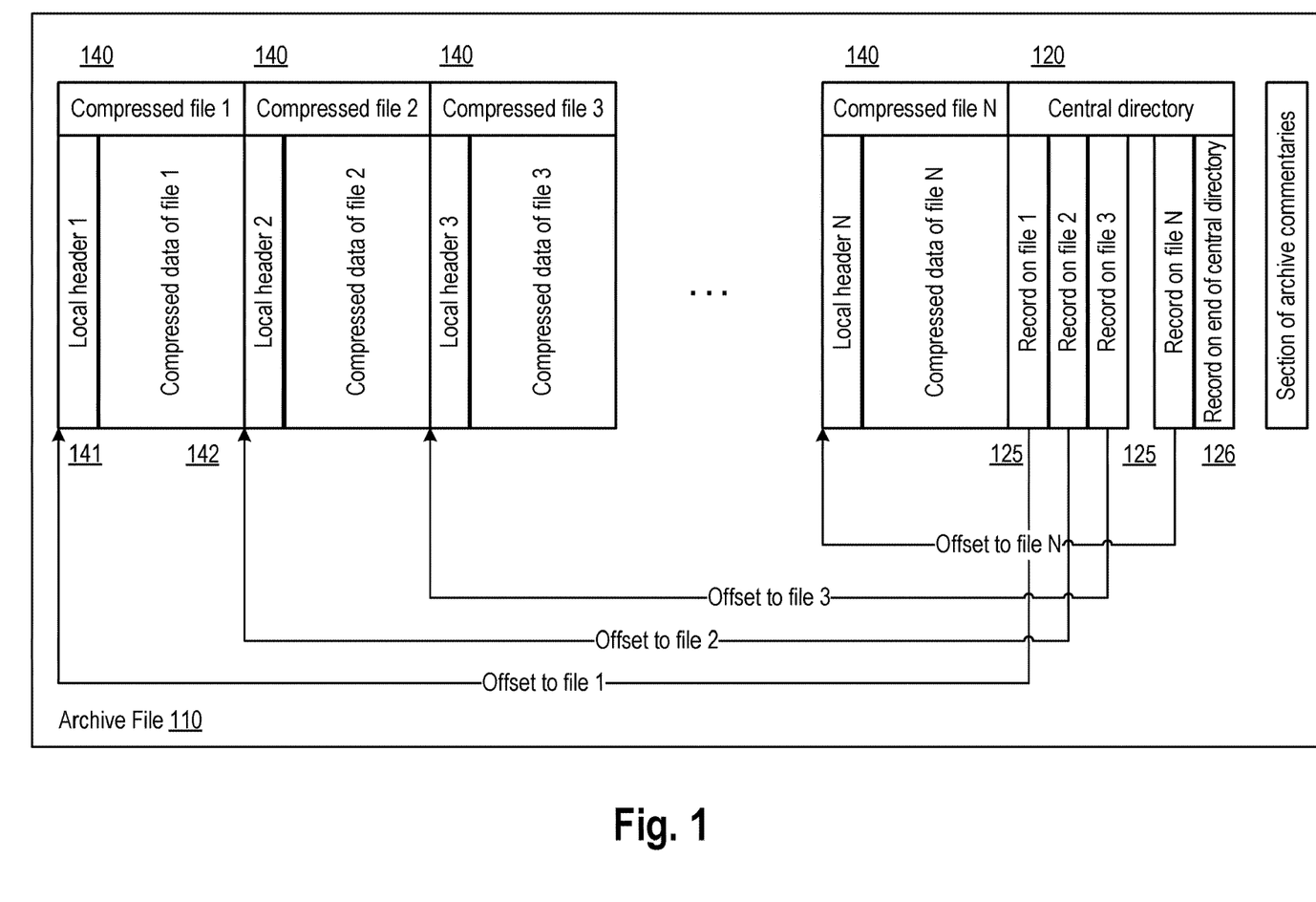
FIG. 1 illustrates a structure of an archive file according to aspects of the present disclosure.

FIG. 1 shows the structure of an archive file 110 according to aspects of the present disclosure. For purposes of discussion, the archive file 110 may be formatted as an Android Package (APK) file for the Android operating system (OS), but it is understood that aspects of the present disclosure may be applied to other types of file formats, including formats for packaging, distributing, and installing of applications on a computing device. Distributions for the Android OS are provided in the form of executable archive APK (Android Package) files. Each Android application is compiled and packaged in a single file, which includes the entire code of the application (DEX files), the resources and the .manifest file, as well as the CERT.RSA—the certificate with which the application is signed—and CERT.SF—file information about the resources and the certificate. Files of APK format are not encrypted; they are a subset of ZIP archive format. Each APK file is a compressed archive for execution by a virtual machine (such as DalvikVM), which may be installed not just on the Android operating system.

In one aspect, each ZIP archive 110 (and consequently APK file) contains a so-called "central directory" 120, which comes at the end of the archive to make possible the adding of new files to the archive. This directory contains a list of the records 125 (names of files and directories) appearing in the archive, as well as the headers of the records. Each header within the central directory may contain, for the file(s) contained within the archive: the size (of a file within the archive) after compression; the size before compression; the length of the file name (of a file within the archive 110); the size of additional data on the file; the size of the commentary on the file; the disk number where the file begins; the relative offset to the local file header (the number of bytes from the start of the disk, where the file begins, to the local header for the file); the file name; additional data about the file; and the commentary on the file.

In one aspect, the central directory 120 ends with an end record 126 (end of central directory or "EOCD" record), which may contain: the number of the current disk; the number of the disk where the central directory begins; the number of records in the central directory on this disk; the total number of records in the central directory; the size of the central directory; the offset to the central directory relative to the start of the archive; the size of the commentary; and the commentary.

Thus, after the reading and analysis of the central directory, it is possible to gain access directly to the compressed data of any record 140 (to the compressed files) stored in the central directory by the offset as described in the header. The data of the record also starts from the local file header 141. The local file header partly includes information which is contained in the central directory, namely: the size (of the corresponding file within the archive) after compression; the size before compression; the length of the file name; the size of additional data on the file; the file name; and additional data about the file. In a record 140, the compressed file data 142 begins (i.e., is arranged) immediately after the corresponding header 141. The data of the records inside the archive 110 may be saved in an order different from their sequence within the central directory.

In order to speed up repeat antivirus scans of archive files in the context of the present disclosure, a pair of "long"/ "short" hash codes is used, which are saved in a local database together with information about a previously performed antivirus scan.

In one aspect, the "short" hash code (or first hash sum) is a hash code computed solely from part of an archive file (for example, from the entire central directory 120 or any portion thereof), while the computing of the "short" hash code may also make use of meta-information about the archive file 110, such as the time of creation/access/modification of the archive file 110, the corresponding digital certificate, the verification hash codes for the embedded objects 140, and so forth.

In one aspect, the "long" hash code (or second hash sum) is a hash code computed from the entire contents of an archive file 110. It is understood that the time for its computation is significantly longer (by orders of magnitude for large archive files) than the time to compute the "short" hash code.

Figure 2:
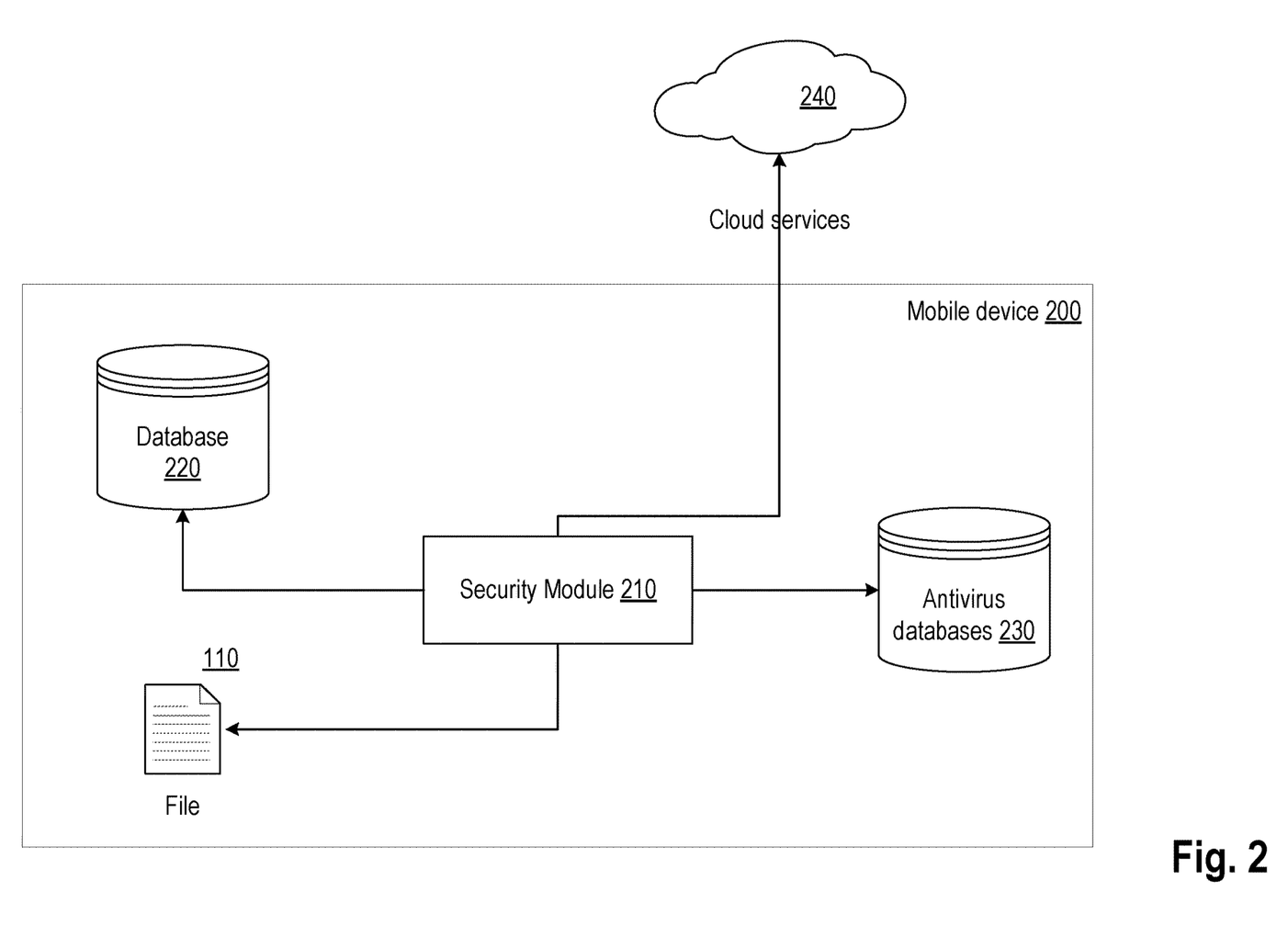
FIG. 2 displays a system for performing a repeat antivirus scan of a file according to an aspect of the present disclosure.

FIG. 2 presents a system for performing a repeat antivirus scan of an archive file 110 (hereinafter in the text, a file 110) in the framework of the present disclosure. In the general case, the described system includes a computing device (such as the computer shown in FIG. 4, or a particular variant of a general-purpose computer—a mobile device 200), containing: at least one processor; network access means, interacting with at least one processor; and an information storage medium, containing an operating system (such as the Android OS), as well as a set of instructions, upon the execution of which on at least one processor the method of performing a repeat antivirus scan of a file 110 is realized.

In a particular variant, the system designed to realize the method of performing a repeat antivirus scan of a file 110 includes: a mobile device 200, containing a security module 210, a database 220 and antivirus databases 230, and cloud services 240.

The cloud services 240 may include: regularly updated knowledge databases on the reputation of files (such as KSN or Kaspersky Security Network), databases of malicious files (so-called "black lists"), and databases of trusted files ("white lists"). The cloud services 240 allow the security module 210 to obtain one of the following verdicts on the hash code of the file 110: malicious file, non-malicious file (if the file 110 is a trusted file), and unknown file.

In one aspect, the security module 210 is a security application (such as an antivirus application), installed on the operating system of the mobile device 200. The security module is designed to perform an antivirus scan of the file 110.

The antivirus scan of the file 110 includes a complex of security measures intended to determine whether the file 110 is a malicious file. In one aspect, the antivirus scan of the file 110 involves requesting a verdict on the file 110 from the cloud services 240 and an antivirus scan of the file 110. In one aspect, the requesting of a verdict is performed by sending with the aid of the security module 210 the "long" hash code of the file 110 to the cloud services 240. The antivirus scan of the file 110 involves at least two methods for analysis of the content of a file 110: signature analysis of the file 110 and heuristic analysis of the file 110. Signature analysis involves searching for correspondences of any section of code of the application being analyzed or a component thereof to known code (a signature) from a database of signatures of malicious applications and their components. Heuristic analysis involves emulating the working of the applications being analyzed and their components, creating emulation logs (containing data on API function calls, parameters sent, sections of code of the applications being analyzed, and so forth) and searching for correspondences between the data of the logs created and the data from a database of behavioral signatures of malicious applications and their components.

The antivirus databases 230 contain regularly updated databases of signatures of malicious applications and their components which are used by the security module 210 to perform the aforementioned signature analysis, as well as databases of behavioral signatures of malicious applications and their components which are used by the security module 210 to perform the aforementioned heuristic analysis. In one aspect, the antivirus databases 230 contain information about the date of each update.

The database 220 is designed to save the information obtained from the security module 210. The database consists of records, each of which is added to the database when the corresponding file (such as the file 110) is recognized as being non-malicious as a result of an antivirus scan, and it contains information identifying the file (the pair of "long"/ "short" hash codes), as well as information about the antivirus scan performed, which includes at least the date of the performance of the antivirus scan of the file and the verdict on the file obtained from the cloud services 240. Since the time to compute the "short" hash code of the file is less than the time to compute the "long" hash code of the file, the "short" hash code is used by the security module 210 for quick access to the information from the database 220, and the "long" hash code of the file is used by the security module 210 when conducting an antivirus scan.

The dates of the updating of the antivirus databases and the dates of the performance of an antivirus scan of the files are time markers containing information about the time of occurrence of the aforementioned events with the necessary accuracy for the realization of aspects of the present disclosure.

The above-described variants of the system (the general and the particular variant) make it possible to carry out in the context of the present disclosure the following methods, which will be described in detail below: a method of performing a repeat antivirus scan of a file and a method of partial resetting of the results of a previous antivirus scan of files.

The method of performing a repeat antivirus scan of a file 101 that is realized with the aid of the systems described above includes steps during which the following occurs. A local database 220 is saved on a mobile device 200, where each record is added to the database 220 when the corresponding file (the file 110) is recognized as being non-malicious as a result of an antivirus scan with the aid of module 210, and contains the first hash sum of the file 110, the second hash sum of the file 110, and information about the antivirus scan performed, which includes at least the date of the performance of the antivirus scan of the file and the verdict from cloud services 240. The first hash sum of the file 110 is computed and the second hash sum of the file 110 and information about the antivirus scan performed and corresponding to the first hash sum of the file 110 is found in the aforementioned database. Using the second hash sum of the file 110, a verdict on the file 110 is requested from the cloud services 240. An antivirus scan of the file 110 is performed with the aid of the security module 210, except when the verdict obtained is unchanged (as compared to the verdict contained in the information about the antivirus scan performed of the obtained record corresponding to the file 110), and no updating of the antivirus databases has occurred since the date of performing the antivirus scan (which is verified by the security module 210 by comparing that date of the antivirus scan of the file 110 to the date of the last updating of the antivirus databases 230).

According to an aspect, a method of partial resetting of the results of a previous antivirus scan of files is provided, where files without information about an antivirus scan performed by a security module 210 contained in a database 220 are again subjected to an antivirus scan with the aid of the security module 210. In such a method of partial resetting, the following steps may be involved. A local database 220 is saved on a mobile device 200, where each record is added to the database 220 when the corresponding file is recognized as being non-malicious as a result of an antivirus scan with the aid of the module 210, and contains information identifying the file, and information about the antivirus scan performed, which includes at least the date of the performance of the antivirus scan of the file. With the aid of the security module 210, a threshold is set for resetting of the records (or a remotely established threshold is obtained with the aid of the security module 210, for example one computed in accordance with a particular user profile). After updating the antivirus databases 230, with the aid of the security module 210, an estimate is made of the probability of resetting the results of the previous antivirus scan for each record from the database 220. In some aspects, the estimate will be higher as more time has passed since the aforementioned date of the performance of the antivirus scan of the corresponding file, and the more updates of the antivirus databases have occurred since the aforementioned date of the performance of the antivirus scan of the corresponding file (being computed by the security module 210 based on information from the antivirus databases 230 on the dates of all updates). With the aid of the security module 210 those records for which the aforementioned estimate of the probability of a reset exceeds the established threshold for resetting of the records are removed from the database 220.

In one aspect, the threshold is a certain numerical value, such as one from 0 to 100. The lower the threshold value, the more records will be removed from the database 220 after the security module 210 performs the aforementioned estimate of the probability of resetting the results of the previous antivirus scans. The threshold may be dynamically changed by the security module 210. In another aspect, the threshold may be determined remotely and sent to the security module 210.

Figure 3:
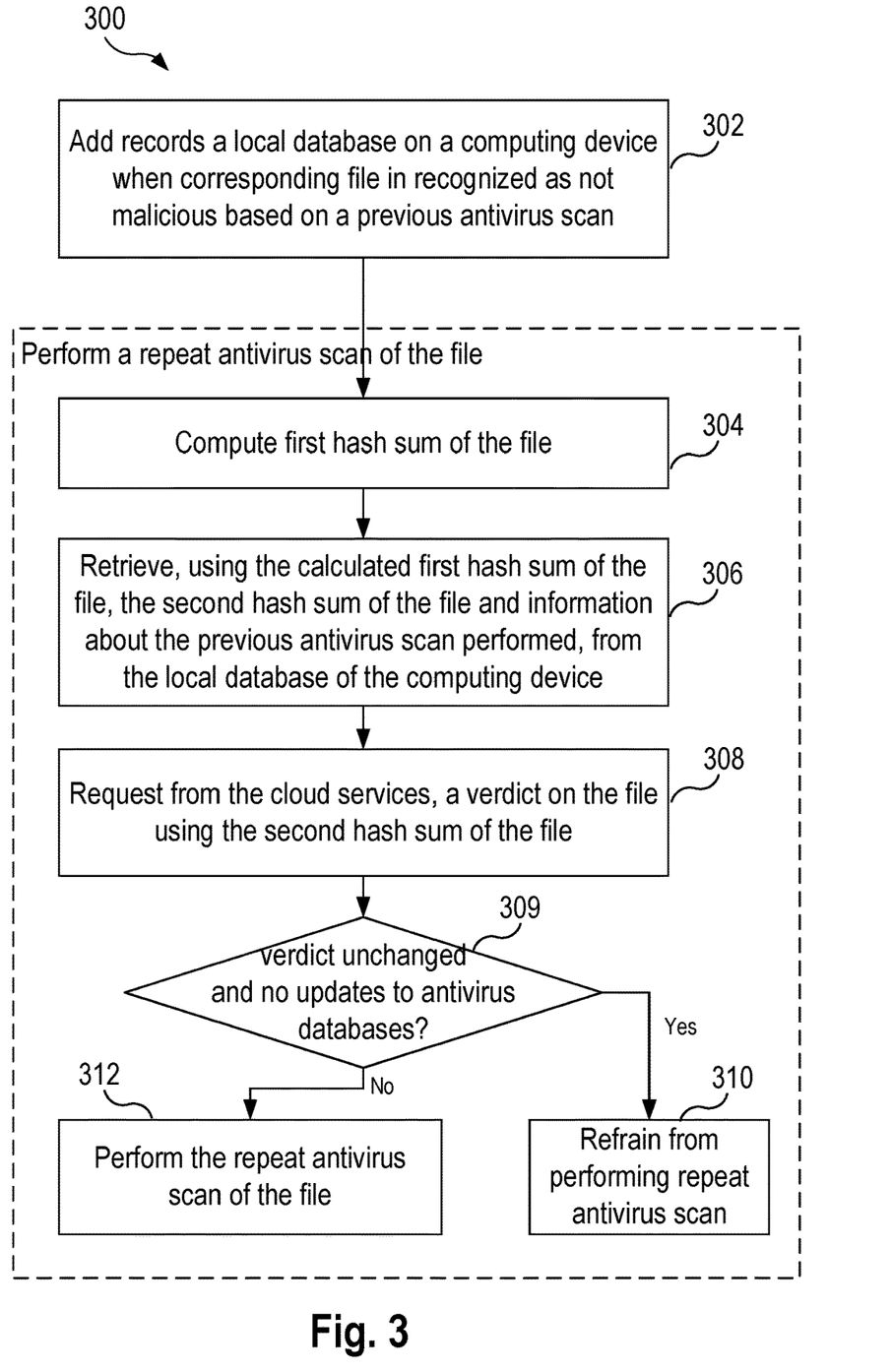
FIG. 3 is a flow diagram for a method for performing a repeat antivirus scan of a file according to an aspect of the present disclosure.

FIG. 3 is a flowchart illustrating a method 300 for performing a repeat antivirus scan of a file according to an exemplary aspect. It is noted that the following description of the exemplary method makes reference to the system and components described above. In some aspects, the computing device is a mobile device, and the file is an archive file comprised of a plurality of files in compressed form and a central directory portion.

The method 300 begins at step 302, in which records are added to a local database on a computing device 200 for files. In one aspect, a record for a corresponding file in response to determining that the corresponding file is not malicious based on a previous antivirus scan. In some aspects, a record may include a first hash sum of the file, a second hash sum of the file, and information about the antivirus scan performed including at least a date of performance of the previous antivirus scan of the file and a verdict from cloud services.

At step 304, the security module 210 may calculate the first hash sum of the file. In some aspects, the first hash sum is computed from a portion of content of the file (in contrast to the second hash sum being computed from an entirety of the content of the file.) In aspects in which the file is an archive file, the first hash sum is computed as a "short" hash sum derived from the central directory portion of the archive file, in contrast to the second "long" hash sum is computed from an entirety of the content of the archive file. In some aspects, a time to calculate the first hash sum of the file is less than a time to calculate the second hash sum of the file.

At step 306, the security module 210 may retrieve, using the calculated first hash sum of the file, the second hash sum of the file and information about the previous antivirus scan performed, from the local database of the computing device. At step 308, the security module 210 may request from the cloud services, a verdict on the file using the second hash sum of the file. In some aspects, the verdict on the file from cloud services is one of the following: a malicious file; a non-malicious file; an unknown file. In some aspects, the cloud services includes regularly updated knowledge databases on the reputation of files, databases of malicious files, and databases of trusted files.

At step 309, the security module 210 may determine whether the verdict obtained is unchanged and that no updates to antivirus databases has occurred since the date of the performance of the previous antivirus scan. If so, at step 310, the security module 210 may refrain from performing the repeat antivirus scan of the file (and rather, rely on the prior verdict and results of the previous antivirus scans) in response to determining that the verdict obtained is unchanged and that no updates to antivirus databases has occurred since the date of the performance of the previous antivirus scan. Otherwise, at step 312, the security module 210 may perform the repeat antivirus scan. In some aspects, the antivirus scan of the file includes one or more of signature analysis of the file and heuristic analysis of the file. In some aspects, the antivirus scan of the file includes one or a combination of requesting a verdict on the file from the cloud services and an antivirus scan by a security module executing on the computing device.

In some aspects, the security module 210 may perform a partial resetting results of previous antivirus scans of files. The resetting may include determining, for each record in the local database, an estimated probability that the corresponding result of the previous antivirus scans should be reset; and removing records from the local database having a corresponding estimated probability that exceeds a predetermined reset-record threshold. In some aspects, the estimated probability is determined to be higher based on more time passing since the corresponding date of the performance of the previous antivirus scan of the corresponding file, and the more updates of the antivirus databases have occurred since the corresponding date of the performance of the pervious antivirus scan of the corresponding file.

FIG. 4 is a block diagram illustrating a computer system 20 on which aspects of systems and methods for performing a repeat antivirus scan of a file may be implemented in accordance with an exemplary aspect. It should be noted that the computer system 20 can correspond to mobile device 200, for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), NRAM, resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for performing a repeat antivirus scan of a file, comprising:
adding, to a local database on a computing device, a record for a corresponding file in response to determining that the corresponding file is not malicious based on a previous antivirus scan, wherein the record comprises a first hash sum of the file, a second hash sum of the file, and information about the previous antivirus scan including at least a date of performance of the previous antivirus scan of the file and a verdict from cloud services, and wherein the file is an archive file comprised of a plurality of files in compressed form and a central directory portion;
performing a repeat antivirus scan of the file comprising:
calculating the first hash sum of the file, wherein the first hash sum is computed from the central directory portion of the archive file;
retrieving, using the calculated first hash sum of the file, the second hash sum of the file and information about the previous antivirus scan performed, from the local database of the computing device;

requesting from the cloud services, a verdict on the file using the second hash sum of the file; and refraining from performing the repeat antivirus scan of the file in response to determining that the verdict obtained is unchanged and that no updates to antivirus databases has occurred since the date of the performance of the previous antivirus scan; otherwise, performing the repeat antivirus scan of the file; and performing partial resetting results of previous antivirus scans of files comprising:

determining, for each record in the local database, an estimated probability that the corresponding result of the previous antivirus scans should be reset, wherein the estimated probability is determined to be higher based on more time passing since the corresponding date of the performance of the previous antivirus scan of the corresponding file, and the more updates of the antivirus databases have occurred since the corresponding date of the performance of the previous antivirus scan of the corresponding file; and removing records from the local database having a corresponding estimated probability that exceeds a pre-determined reset-record threshold.

2. The method of claim 1, wherein the computing device is a mobile device.

3. The method of claim 1, wherein the second hash sum is computed from an entirety of the content of the archive file.

4. The method of claim 1, wherein the first hash sum is computed from a portion of content of the file, and wherein the second hash sum is computed from an entirety of the content of the file.

5. The method of claim 1, wherein a time to calculate the first hash sum of the file is less than a time to calculate the second hash sum of the file.

6. The method of claim 1, wherein the antivirus scan of the file includes one or more of signature analysis of the file and heuristic analysis of the file.

7. The method of claim 1, wherein the previous antivirus scan of the file includes one or a combination of requesting a verdict on the file from the cloud services and an antivirus scan by a security module executing on the computing device.

8. The method of claim 1, wherein the verdict on the file from cloud services is one of the following: a malicious file; a non-malicious file; an unknown file.

9. The method of claim 1, wherein the cloud services comprises regularly updated knowledge databases on the reputation of files, databases of malicious files, and databases of trusted files.

10. A system for performing a repeat antivirus scan of a file, comprising:

a memory device configured to store a local database, wherein the local database comprises a record for a corresponding file added in response to determining that the corresponding file is not malicious based on a previous antivirus scan, wherein the record comprises a first hash sum of the file, a second hash sum of the file, and information about the previous antivirus scan including at least a date of performance of the previous antivirus scan of the file and a verdict from cloud services, and wherein the file is an archive file comprised of a plurality of files in compressed form and a central directory portion;

a hardware processor communicatively coupled to the memory device, and configured to perform:

a repeat antivirus scan of the file comprising:

calculate the first hash sum of the file, wherein the first hash sum is computed from the central directory portion of the archive file;

retrieve, using the calculated first hash sum of the file, the second hash sum of the file and information about the previous antivirus scan performed, from the local database of the computing device;

request from the cloud services, a verdict on the file using the second hash sum of the file; and refrain from performing the repeat antivirus scan of the file in response to determining that the verdict obtained is unchanged and that no updates to antivirus databases has occurred since the date of the performance of the previous antivirus scan; otherwise, perform the repeat antivirus scan of the file; and wherein the processor is further configured to partial reset results of previous antivirus scans of files by:

determining, for each record in the local database, an estimated probability that the corresponding result of the previous antivirus scans should be reset, wherein the estimated probability is determined to be higher based on more time passing since the corresponding date of the performance of the previous antivirus scan of the corresponding file, and the more updates of the antivirus databases have occurred since the corresponding date of the performance of the previous antivirus scan of the corresponding file; and removing records from the local database having a corresponding estimated probability that exceeds a pre-determined reset-record threshold.

11. The system of claim 10, wherein the system is a mobile device.

12. The system of claim 10, wherein the second hash sum is computed from an entirety of the content of the archive file.

13. The system of claim 10, wherein the first hash sum is computed from a portion of content of the file, and wherein the second hash sum is computed from an entirety of the content of the file.

14. The system of claim 10, wherein a time to calculate the first hash sum of the file is less than a time to calculate the second hash sum of the file.

15. The system of claim 10, wherein the cloud services comprises regularly updated knowledge databases on the reputation of files, databases of malicious files, and databases of trusted files.

16. A non-transitory computer readable medium comprising computer executable instructions for performing a repeat antivirus scan of a file, including instructions for:

adding, to a local database on a computing device, a record for a corresponding file in response to determining that the corresponding file is not malicious based on a previous antivirus scan, wherein the record comprises a first hash sum of the file, a second hash sum of the file, and information about the previous antivirus scan including at least a date of performance of the previous antivirus scan of the file and a verdict from cloud services, and wherein the file is an archive file comprised of a plurality of files in compressed form and a central directory portion;

performing a repeat antivirus scan of the file comprising:

calculating the first hash sum of the file, wherein the first hash sum is computed from the central directory portion of the archive file;

retrieving, using the calculated first hash sum of the file, the second hash sum of the file and information about the previous antivirus scan performed, from the local database of the computing device;

requesting from the cloud services, a verdict on the file using the second hash sum of the file; and refraining from performing the repeat antivirus scan of the file in response to determining that the verdict obtained is unchanged and that no updates to antivirus databases has occurred since the date of the performance of the previous antivirus scan; otherwise, performing the repeat antivirus scan of the file; and performing partial resetting results of previous antivirus scans of files comprising:

determining, for each record in the local database, an estimated probability that the corresponding result of the previous antivirus scans should be reset, wherein the estimated probability is determined to be higher based on more time passing since the corresponding date of the performance of the previous antivirus scan of the corresponding file, and the more updates of the antivirus databases have occurred since the corresponding date of the performance of the pervious antivirus scan of the corresponding file; and removing records from the local database having a corresponding estimated probability that exceeds a pre-determined reset-record threshold.

\* \* \* \* \*